United States Patent
Fortman et al.

(10) Patent No.: US 7,457,855 B2
(45) Date of Patent: Nov. 25, 2008

(54) NETWORK CONFIGURATION MANAGEMENT

(75) Inventors: Peter A. Fortman, Leesburg, VA (US); Elias George Livaditis, Vienna, VA (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 10/519,095

(22) PCT Filed: Apr. 30, 2004

(86) PCT No.: PCT/US2004/013598

§ 371 (c)(1),
(2), (4) Date: Jan. 27, 2006

(87) PCT Pub. No.: WO2005/114444

PCT Pub. Date: Dec. 1, 2005

(65) Prior Publication Data

US 2006/0168163 A1    Jul. 27, 2006

(51) Int. Cl.
G06F 15/16     (2006.01)
G06F 15/173    (2006.01)
G06F 15/177    (2006.01)

(52) U.S. Cl. .................. 709/221; 709/220; 709/224; 709/227; 709/228

(58) Field of Classification Search .............. 709/206, 709/224, 225, 227, 228, 220, 221
See application file for complete search history.

(56) References Cited

U.S. PATENT DOCUMENTS

| | | | |
|---|---|---|---|
| 5,571,710 A | 11/1996 | Barnett et al. | |
| 5,646,248 A | 7/1997 | Sawada et al. | |
| 5,965,710 A | 10/1999 | Bodmer et al. | |
| 6,022,958 A | 2/2000 | Barnett et al. | |
| 6,327,677 B1 | 12/2001 | Garg et al. | |
| 6,421,719 B1 | 7/2002 | Lewis et al. | |
| 6,546,091 B1 | 4/2003 | Wehmeyer et al. | |

(Continued)

FOREIGN PATENT DOCUMENTS

WO    WO 98/39467 A2    9/1998

(Continued)

OTHER PUBLICATIONS

Keith M. Skubitz et al.; "Synthetic Peptides of CD66a Stimulate Neutrophil Adhesion to Endothelial"; *The Journal of Immunology*; pp. 1-8; 2000.

(Continued)

*Primary Examiner*—Quang N. Nguyen
(74) *Attorney, Agent, or Firm*—Fish & Richardson P.C.

(57) ABSTRACT

One implementation provides a computer-implemented method for modifying network configuration information on a client node. In this implementation, the client node establishes a first network connection with a host node using at least one network configuration parameter and collects configuration history information. The configuration history information includes at least one parameter that is related to the first network connection. The client node also analyzes policy information that includes a rule that is used for specifying a predetermined criterion. If one of the parameters in the configuration history information does not satisfy the predetermined criterion, the client node modifies one of the network configuration parameters. The client node is then capable of establishing a second network connection with the host node using the modified network configuration parameter.

18 Claims, 8 Drawing Sheets

U.S. PATENT DOCUMENTS

| | | | |
|---|---|---|---|
| 6,571,290 B2 * | 5/2003 | Selgas et al. | 709/228 |
| 2002/0013896 A1 * | 1/2002 | Dieterman et al. | 713/100 |
| 2002/0069284 A1 * | 6/2002 | Slemmer et al. | 709/227 |
| 2003/0063659 A1 | 4/2003 | Kaltiainen et al. | |
| 2003/0097442 A1 * | 5/2003 | Farhat et al. | 709/224 |
| 2003/0097450 A1 * | 5/2003 | Ogg et al. | 709/227 |
| 2003/0105839 A1 | 6/2003 | Ben | |
| 2004/0030752 A1 * | 2/2004 | Selgas et al. | 709/206 |
| 2004/0177144 A1 * | 9/2004 | Yip | 709/225 |

FOREIGN PATENT DOCUMENTS

WO     WO 99/19478 A1     4/1999

OTHER PUBLICATIONS

Ana M. Teixeira et al.; "The N-Domain of the Biliary Glycoprotein (BGP) Adhesion Molecule Mediates Homotypic Binding: Domain Interactions and Epitope Analysis of BGPc"; *Blood*, vol. 84, No. 1; pp. 211-219; 1994.

Suzanne M. Watt et al.; "The Identification of Critical Adhesiotopes on the N- Domain of Human Ceacam1 Required for Homophilic Interations"; *CEACAM HLDA-7 Manuscript; Leucocyte Typing VII, HLDA7* Ref. #S.8; 2000.

"Dial Up Management System (DMS) Feature Overview"; *Merando Software, Inc.*; pp. 1-3; 2001.

Keith Skubitz et al.; "PROW and IWHLDA present the Guide on: CD66a"; *Protein Reviews On the Web*; http://www.ncbi.nlm.nih.gov/prow/cd/cd66a.htm; 1999.

Keith Skubitz et al.; "PROW and IWHLDA present the Guide on: CD66b"; *Protein Reviews On the Web*; http://www.ncbi.nlm.nih.gov/prow/cd/cd66b.htm; 1999.

Keith Skubitz et al.; "PROW and IWHLDA present the Guide on: CD66c"; *Protein Reviews On the Web*; http://www.ncbi.nlm.nih.gov/prow/cd/cd66c.htm; 1999.

Keith Skubitz et al.; "PROW and IWHLDA present the Guide on: CD66d"; *Protein Reviews On the Web*; http://www.ncbi.nlm.nih.gov/prow/cd/cd66d.htm; 1999.

Keith Skubitz et al.; "PROW and IWHLDA present the Guide on: CD66e"; *Protein Reviews On the Web*; http://www.ncbi.nlm.nih.gov/prow/cd/cd66e.htm; 1999.

Keith Skubitz et al.; "PROW and IWHLDA present the Guide on: CD66f"; *Protein Reviews On the Web*; http://www.ncbi.nlm.nih.gov/prow/cd/cd66f.htm; 1999.

PCT Communication including Notification of Transmittal of the International Search Report and the Written Opinion of the International Searching Authority in International Application No. PCT/US04/13598; 8 pages; Sep. 15, 2004.

* cited by examiner

NETWORK CONFIGURATION MANAGEMENT

TECHNICAL FIELD

This description relates to configuration management in networked systems.

BACKGROUND

In many existing networked systems, client nodes establish connections to host nodes in a network. The client nodes and host nodes are then able to communicate for a duration of time. In many situations, an Internet Service Provider (ISP) may manage the host nodes. For example, the ISP may configure the host nodes with groups of modems contained in modem pools, and a client node may acquire access to the Internet by connecting to one of the modems in the pool. The client nodes may include home or business computing systems. In these scenarios, the host nodes may often be referred to as Points of Presence, or PoP's. In certain scenarios, the client nodes may be able to directly communicate with the host nodes using broadband connections.

Often, host nodes in a network will maintain policy information. This policy information may include access information that may be used by the client nodes to access the host nodes. For example, the access information could include modem dial-in numbers, Internet Protocol (IP) addresses, and the like. The host nodes then provide the policy information to the various client nodes in the network. In certain scenarios, the host nodes may even provide configuration information, such as modem configuration information, to the client nodes. The client nodes may use this initial configuration information to set up their dial-up modems, and may also use the policy information to select a dial-in access number for a given host node.

If client nodes do not have access to local dial-in access numbers, they may often use a more generic access number to make an initial connection. For example, a client node may use an "800" access number to access a host node using a dial-up connection. The client node may then specify a particular area code, and the host node may respond by providing a list of dial-in access numbers that correspond to the specified area code. Subsequently, the client node may establish dial-up connections using one of the provided access numbers.

In certain situations, the client or host nodes may collect various forms of historical or statistical information relating to their network connections. For example, for modem-based connections, a client node or a host node may collect information relating to the total number of calls initiated or received, the call success rate, average session lengths, and the like. This type of information can be displayed to an administrator on a graphical user interface (GUI) to provide a summary of network activity, and can also be distributed to users in a report format.

SUMMARY

One implementation provides a computer-implemented method for modifying network configuration information on a client node. In this implementation, the client node establishes a first network connection with a host node using at least one network configuration parameter and collects configuration history information. The configuration history information includes at least one parameter that is related to the first network connection. The client node also analyzes policy information that includes a rule that is used for specifying a predetermined criterion. If one of the parameters in the configuration history information does not satisfy the predetermined criterion, the client node modifies one of the network configuration parameters. The client node is then capable of establishing a second network connection with the host node using the modified network configuration parameter.

The details of various implementations are set forth in the accompanying drawings and the description below. Other features will be apparent from the description and drawings, and from the claims.

DETAILED DESCRIPTION

Figure 1:
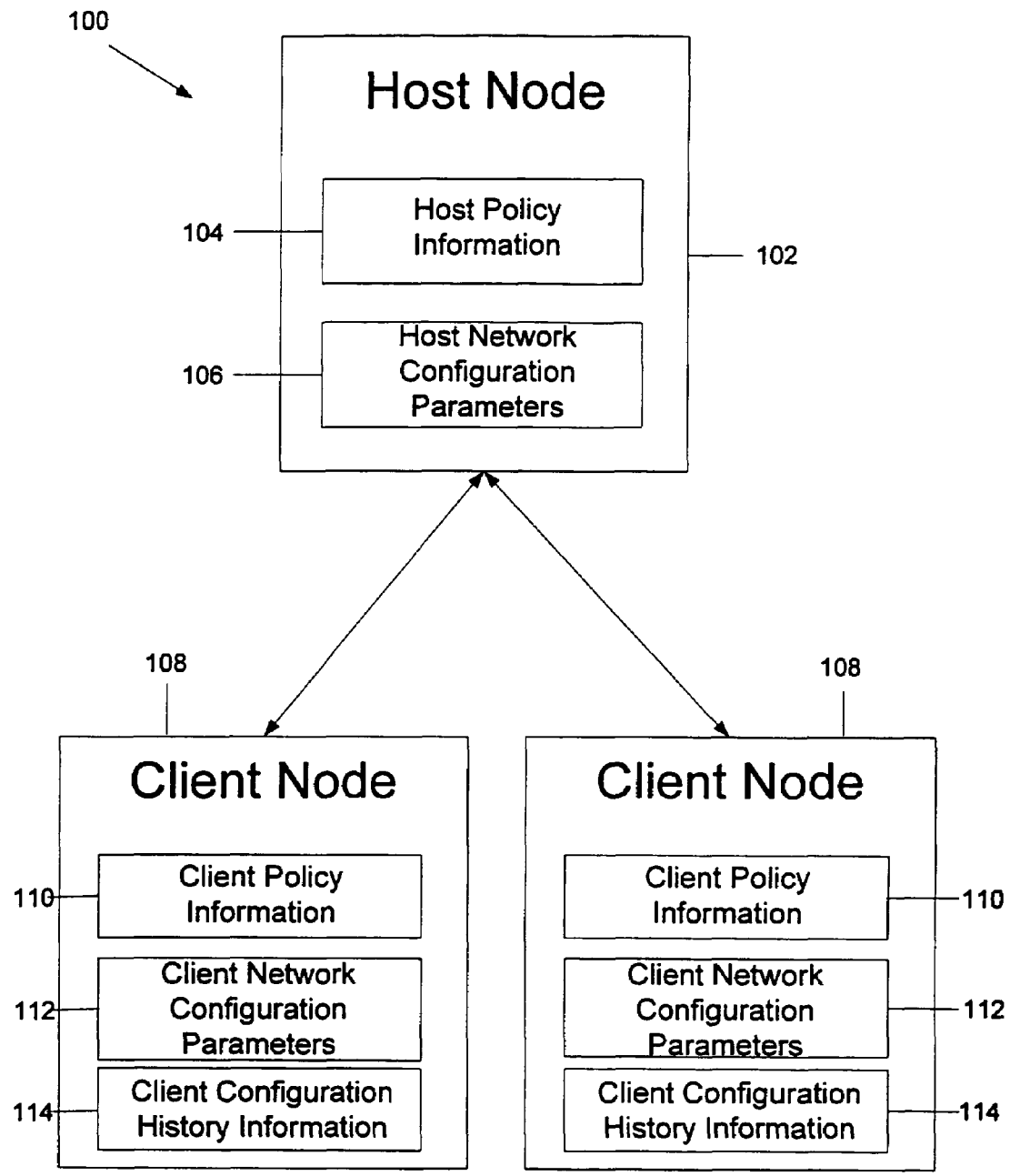
FIG. 1, FIG. 2A, and FIG. 3A are block diagrams of systems that include a host node and client nodes.

FIG. 1 is a block diagram of a system 100 that includes a host node 102 that is coupled to a first client node 108 and a second client node 108. The system 100 provides for the modification of network configuration information on the first client node 108 and/or the second client node 108. Each client node 108 includes policy information 110, one or more network configuration parameters 112, and configuration history information 114. The host node 102 includes policy information 104 and network configuration parameters 106.

During operation, each client node 108 establishes a network connection, such as a modem or Internet-based broadband connection, with the host node 102. In establishing this connection, each client node 108 uses its network configuration parameters 112. These parameters 112 may include modem parameters (as shown in FIG. 2C and described below), Internet network parameters (as shown in FIG. 3C and described below), and the like. Similarly, when opening a connection with each client node 108, the host node 102 uses its network configuration parameters 106. These parameters 106 may include modem parameters (as shown in FIG. 2B and described below), Internet network parameters (as shown in FIG. 3B and described below), and the like.

After the connection has been established, each client node 108 is able to send data to and receive data from the host node 102. Each client node 108 also collects configuration history information 114, which contains one or more parameters that are related to the connection established with the host node 102. The configuration history information 114 may also contain parameters related to previous connections that have been established with the host node 102. The configuration history information 114 may include modem history information (as shown in FIG. 2C and described below), Internet history information (as shown in FIG. 3C and described below), and the like. The policy information 110 contains one or more rules that are used for specifying one or more predetermined criteria. The policy information 110 may include modem policy information (as shown in FIG. 2C and described below), Internet policy information (as shown in FIG. 3C and described below), and the like.

If a parameter in the configuration history information 114 does not satisfy one of the predetermined criteria, the client node 108 modifies its network configuration parameters 112 when establishing subsequent connections with the host node 102. For example, a rule contained in the policy information 110 may be applied to determine that a performance statistic in the configuration history information 114 does not satisfy one of the predetermined criteria relating to performance. In this scenario, the client node 108 would then modify its network configuration parameters 112 in an attempt to improve the performance of connections made with the host node 102.

In some implementations, the host node 102 includes policy information 104 and provides this information to the client node 108. The client node 108 receives this information from the host node 102 and stores this information as its policy information 110. The policy information 104 on the host node 102 may include modem policy information (as shown in FIG. 2B and described below), Internet policy information (as shown in FIG. 3B and described below), and the like.

In some implementations, the rules contained in the policy information 104 maintained on the host node 102 and the policy information 110 maintained on the client node 108 include rules for specifying cost or performance criteria. In these implementations, the client node 108 is able to use these rules to determine how to modify the network configuration parameters 112. For example, if the rules specify that the client node 108 should more strongly weight cost considerations, then the client node 108 may modify the network configuration parameters 112 based upon analysis of the configuration history information 114 to enable a cost-efficient mode of communication with the host node 102. If, however, the rules specify that the client node 108 should more strongly weight performance considerations, then the client node 108 may modify the network configuration parameters 112 based upon analysis of the configuration history information 114 to enable a high-performance mode of communication with the host node 102. In certain situations, the client node 108 may enable a high-performance mode of communication at the expense of higher cost. However, the rules attempt to strike a balance between the various cost and performance considerations based on the requirements or specifications of the policy information 110.

In some implementations, the policy information 110 maintained by the client node 108 includes host access information used by the client node 108 when modifying the network configuration parameters 112. The host access information may include modem access numbers for the host node 102 or Internet Protocol (IP) address information for the host node 102. For example, if the client node 108 and the host node 102 communicate using a modem network, the host node 102 may update the policy information 110 of the client node 108 with an updated set of modem access numbers for the host node 102. The client node 108 may then update its network configuration parameters 112 to use one of the updated modem access numbers when establishing subsequent network connections with the host node 102 based on the rules contained in the policy information 110.

In some implementations, each client node 108 sends its configuration history information 114 to the host node 102. The host node 102 is then capable of processing the configuration history information 114 from each client node 108 to update its policy information 104. For example, the host node 102 may review and process performance statistics contained in the configuration history information 114 received from each client node 108 to update the rules relating to performance in the policy information 104.

Figure 2A:
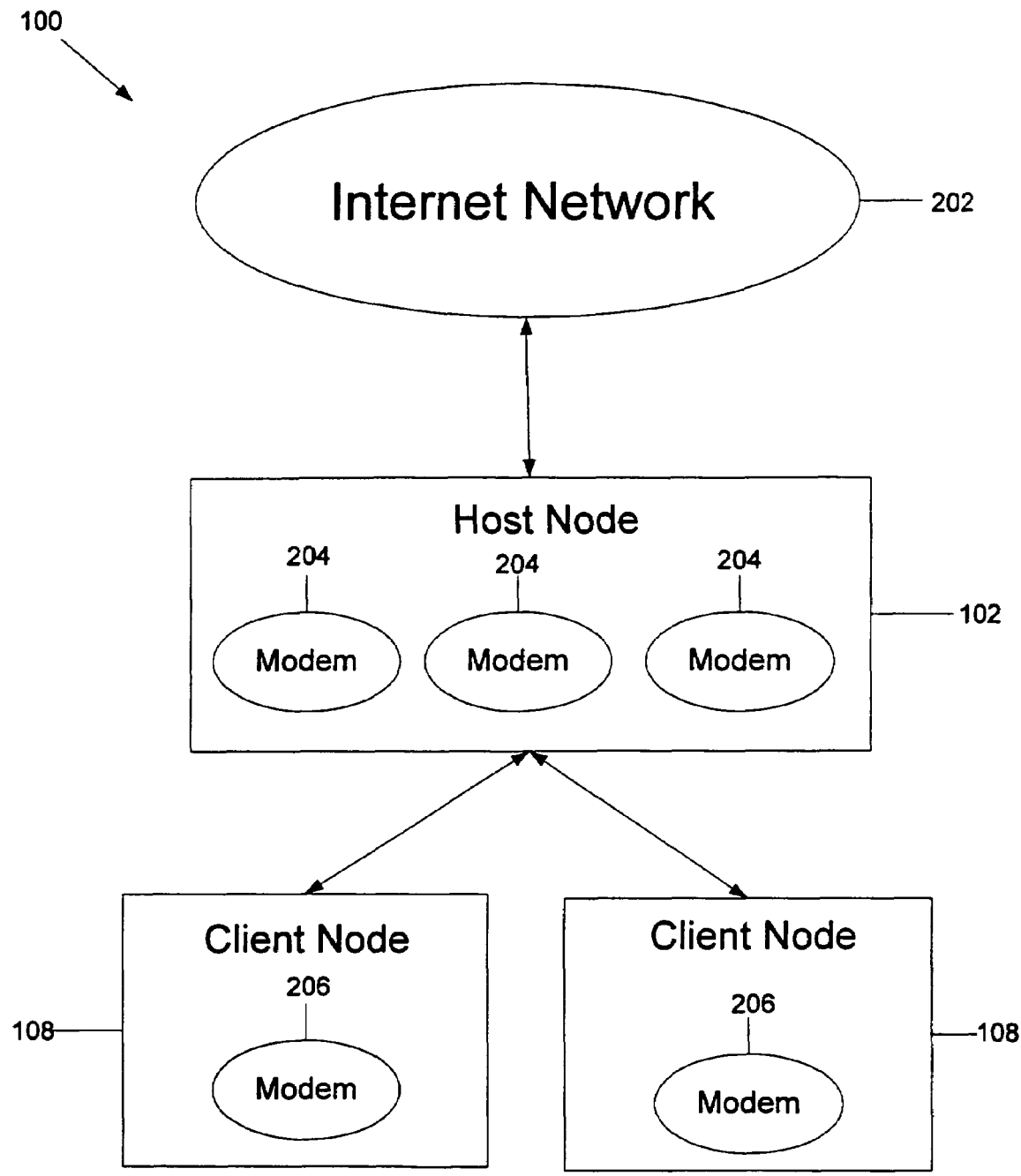
Figure 2B:
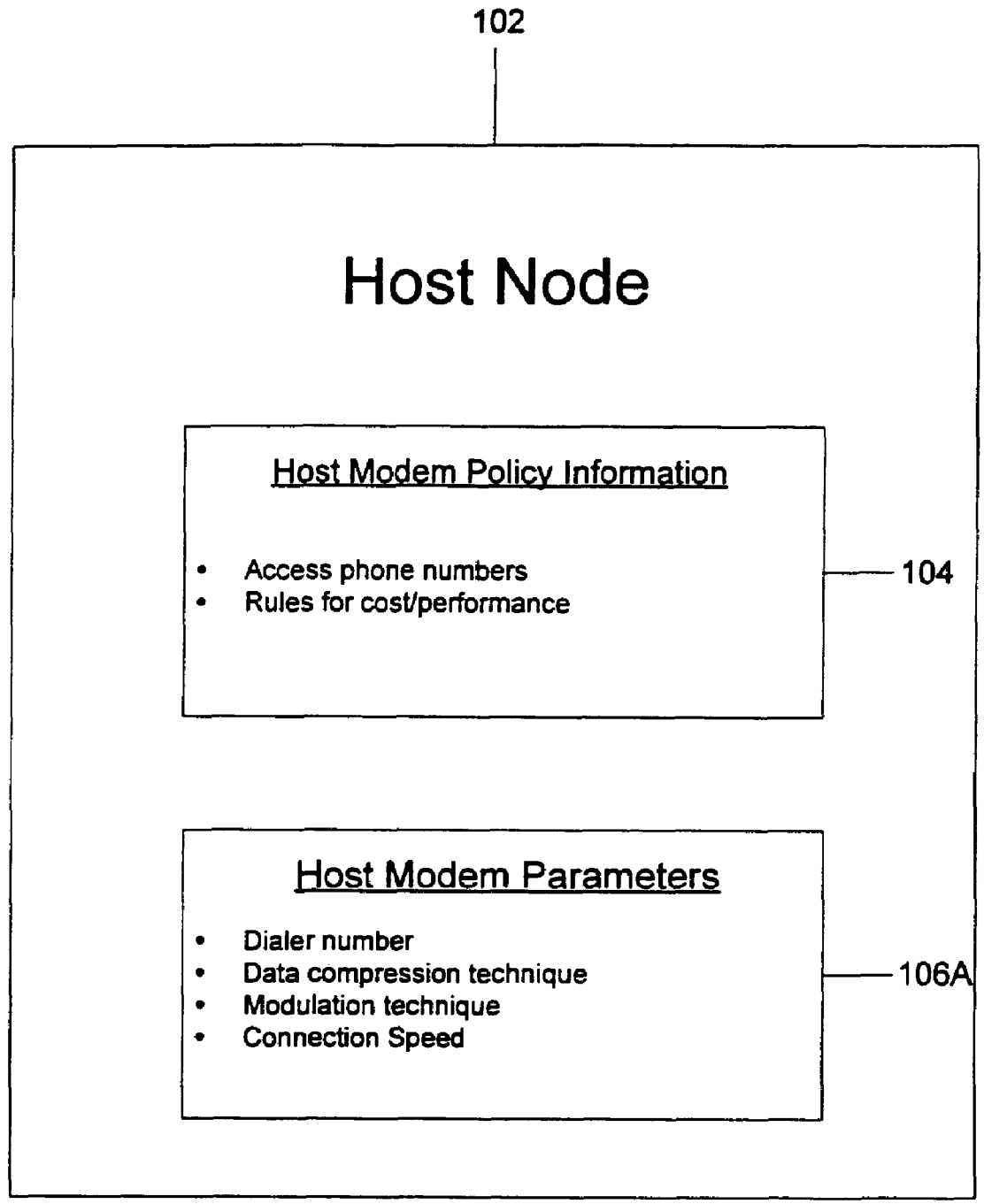
FIG. 2B is a block diagram of the host node in the system of FIG. 2A.
Figure 2C:
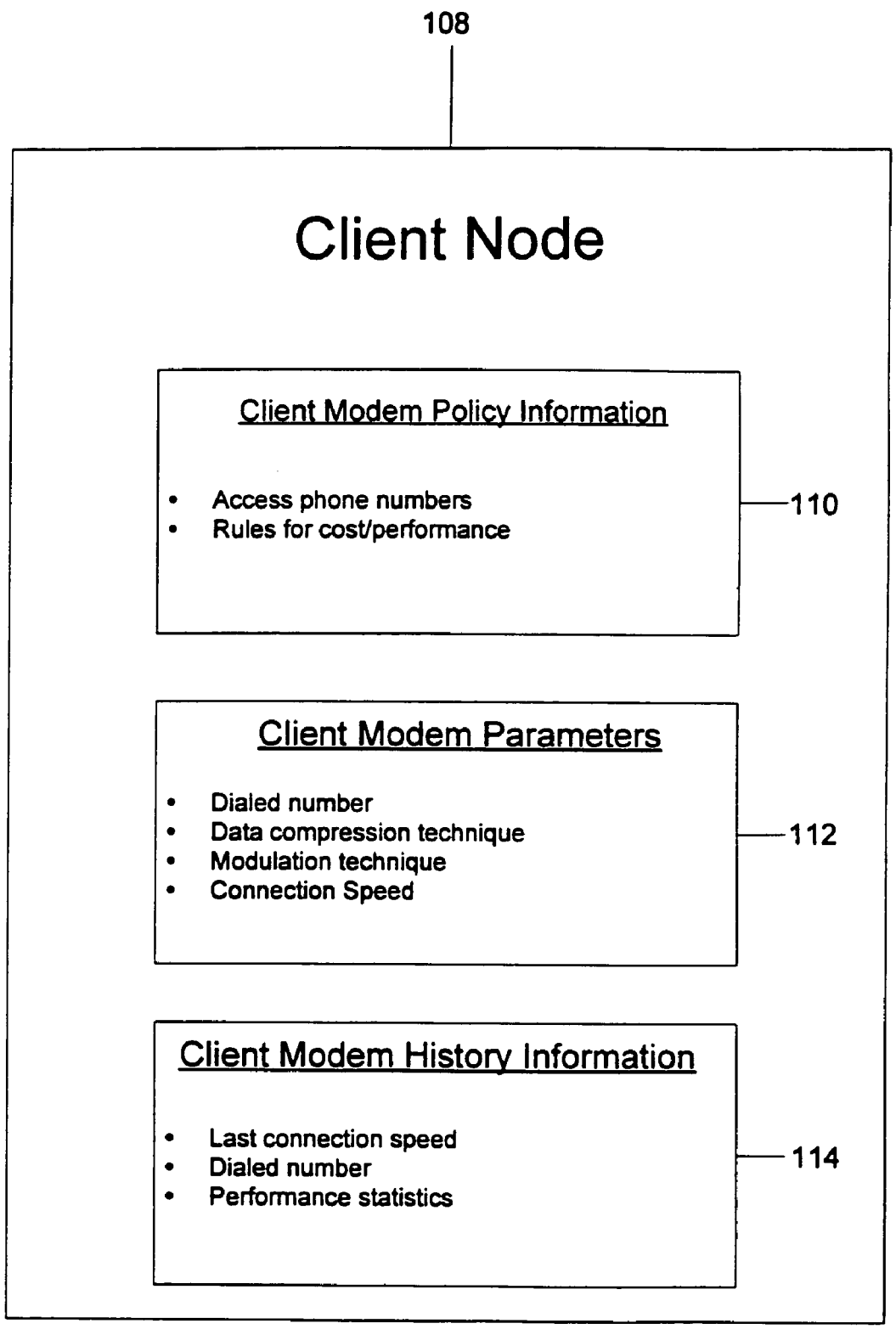
FIG. 2C is a block diagram of the client node in the system of FIG. 2A.

FIG. 2A is a block diagram of one implementation of the system 100 shown in FIG. 1. In this implementation, each client node 108 uses the host node 102 to gain access to an Internet network 202. For example, an Internet Service Provider (ISP) may allow each client node 108, such as client or home computers, to gain access to the Internet network 202 by connecting to the host node 102.

Each client node 108 includes a modem 206 to communicate with the host node 102. The host node 102 includes first, second, and third modems 204 that comprise a modem pool. During operation, each client node 108 uses its modem 206 to connect to one of the modems 204 in the modem pool by using its network configuration parameters 112. The modem 206 of each client node 108 uses the network configuration parameters 112 when connecting to the host node 102. Once these connections are established, each client node 108 has access to the Internet network 202.

FIG. 2B is a block diagram of the host node 102 in the system of FIG. 2A. In this implementation, the host node 102 maintains both its modem policy information 104 and its modem parameters 106A in a database. The modem parameters 106A are part of the full set of network configuration parameters 106 maintained by the host node 102, and are associated with a connection to a given client node 108. In one implementation, the host node 102 provides the modem policy information 104 to each client node 108. The host node 102 also configures one of the modems 204 in its modem pool using the modem parameters 106A.

As shown in the example in FIG. 2B, the modem policy information 104 may, for example, include access phone numbers, rules for specifying cost or performance criteria. The access phone numbers include the numbers for each modem 204 in the modem pool on the host node 102. As discussed earlier, the rules in the modem policy information 104 are used to specify various cost or performance criteria. In one implementation, the host node 102 provides these rules to each client node 108. The rules may specify that cost considerations are to be strongly weighted, that performance considerations are to be strongly weighted, or that cost and performance considerations are to be more evenly weighted. In one implementation, the various cost or performance criteria are based upon analysis of performance statistics gathered on the host node 102 from each client node 108. These rules may then be used determine the configuration of modem parameters, such as parameters 106 on the host node 102 or the parameters 112 on each client node 108.

As also shown in FIG. 2B, the modem parameters 106A may, for example, include a dialer number, a data compression technique, a modulation technique, and a connection speed. The dialer number is the phone number used by the modem 206 of the client node 108 when connecting to the host node 102. The data compression technique and the modulation technique specify the types of data compression and modulation that are to be used during modem communication. For example, the data compression technique may be MNP5, V.42bis, or any other standard or recognized form of data compression, while the modulation technique may be V.21, V.22bis, V.32bis, or any other standard or recognized form of modulation. The connection speed specifies the speed of data transmission used by the modems 204 on the host node 102. The modem parameters 106A may include any number of other standard parameters that may be used to set and configure each modem 204 in the modem pool of the host node 102.

FIG. 2C is a block diagram of the client node in the system of FIG. 2A. In this implementation, the client node 108 maintains its modem policy information 110, its modem parameters 112, and its modem history information 114 in a database. The client node 108 is able to use the modem policy information 110 along with the modem history information 114 to modify its modem parameters 112 when appropriate. The modem parameters 112 affect the settings of the modem 206 used by the client node 108 when communicating with the host node 102.

The modem policy information 110 includes access phone numbers, rules for specifying cost or performance criteria. The access phone numbers include the access numbers for each modem 204 in the modem pool on the host node 102. The rules in the modem policy information 110 are used to specify various cost or performance criteria that are to be implemented by the client node 108. In one implementation, the client node 108 receives these from the host node 102. The rules may specify that cost considerations are to be strongly weighted, that performance considerations are to be strongly weighted, or that cost and performance considerations are to be more evenly weighted. These rules will be used to determine the configuration of the modem parameters 112 on the client node 108.

As also shown in FIG. 2C, the modem parameters 112 may include, for example, a dialed number, a data compression technique, a modulation technique, and a connection speed. The dialed number is the phone number dialed by the client node 108 when connecting to the host node 102. This dialed number will correspond to the access number of one of the modems 204 in the modem pool of the host node 102. The data compression technique could be MNP5, V.42bis, or any other standard or recognized form of data compression. Similarly, the modulation technique could be V.21, V.22bis, V.32bis, or any other standard or recognized form of modulation. The connection speed specifies the speed of data transmission used by the modem 206 when connecting to the host node 102. The modem parameters 112 may include any number of other standard parameters that may be used to set and configure the modem 206 on the client node 108. In one implementation, the modem 206 on the client node 108 stores a version of the modem parameters 112.

The modem history information 114 includes various history, performance, statistical, or other forms of information relating to the use of the modem parameters 112 for connections made between the client node 108 and the host node 102. As shown in FIG. 2C, the modem history information 114 may include, for example, the last modem connection speed, the last dialed number, and performance statistics. The last modem connection speed specifies the speed of the previous connection between the modem 206 and one of the modems 204 on the host node 102. The last dialed number specifies the previous number dialed by the modem 206 to access the host node 102. This number will correspond to one of the modems 204 in the modem pool on the host node 102. The performance statistics may include various forms of statistical information relating to the performance of connections between the modem 206 on the client node 108 and the modem pool on the host node 102. The performance statistics may also include failure rate information relating to these connections, such as abnormal disconnect rates, connect failure rates, retrain rates, busy rates, and signal-to-noise rates. The modem history information 114 may include many other forms of information in addition to the information listed in FIG. 2C. Examples of such additional information include the total number of connections attempted and/or established with the host node 102 and the individual or average session lengths with the host node 102.

During operation, the host node 102 may provide its updated modem policy information 104 to each client node 108 using existing connections. The host node 102 uses its modem parameters 106A when communicating with a given client node 108 using one of its modems 204. Each client node 108 may then store this information as its modem policy information 110. The modem policy information 110 includes a set of access numbers to the modems 204 in the modem pool on the host node 102. When one of the client nodes 108 wants to initiate a subsequent connection with the host node 102, it will use one of these access numbers, along with its other modem parameters 112, to establish a connection from its modem 206 to the modem 204 on the host node 102 that is associated with this access number. This client node 108 will also store information related to this connection with the host node 102 in its modem history information 114.

The client node 108 may also use its modem policy information 110, along with its modem history information 114, to determine whether it will modify its modem parameters 112. In doing so, the client node 108 uses the rules contained within the modem policy information 110 that specify the cost and performance criteria. If these rules specify that performance considerations are to be strongly weighted, then the client node 108 may consider making modifications to its parameters 112 to improve performance. For example, the client node 108 may determine from its modem history information 114 that a parameter, such as a performance statistic for a previously dialed number, does not satisfy one of the predefined performance criteria specified by the rules of the policy information 110. In this scenario, the client node 108 may try increasing the connection speed in the modem parameters 112 to achieve higher performance. Alternatively, the client node 108 may select a different access number in the modem parameters 112 if connections made using the current access number are not yielding sufficiently high performance.

In certain situations, however, the rules of the policy 110 may specify that cost considerations are to be more strongly weighted. For example, the client node 108 may determine from its modem history information 114 that a parameter, such as a performance statistic, does not satisfy one of the predefined cost criteria. In this case, the client node 108 may decide to modify its modem parameters 112 to use a slower speed, or a more cost-efficient, connection. In this fashion, the client node 108 is capable of dynamically modifying its modem parameters 112 based on the rules contained in the modem policy information 110 and on its collected modem history information 114.

Figure 3A:
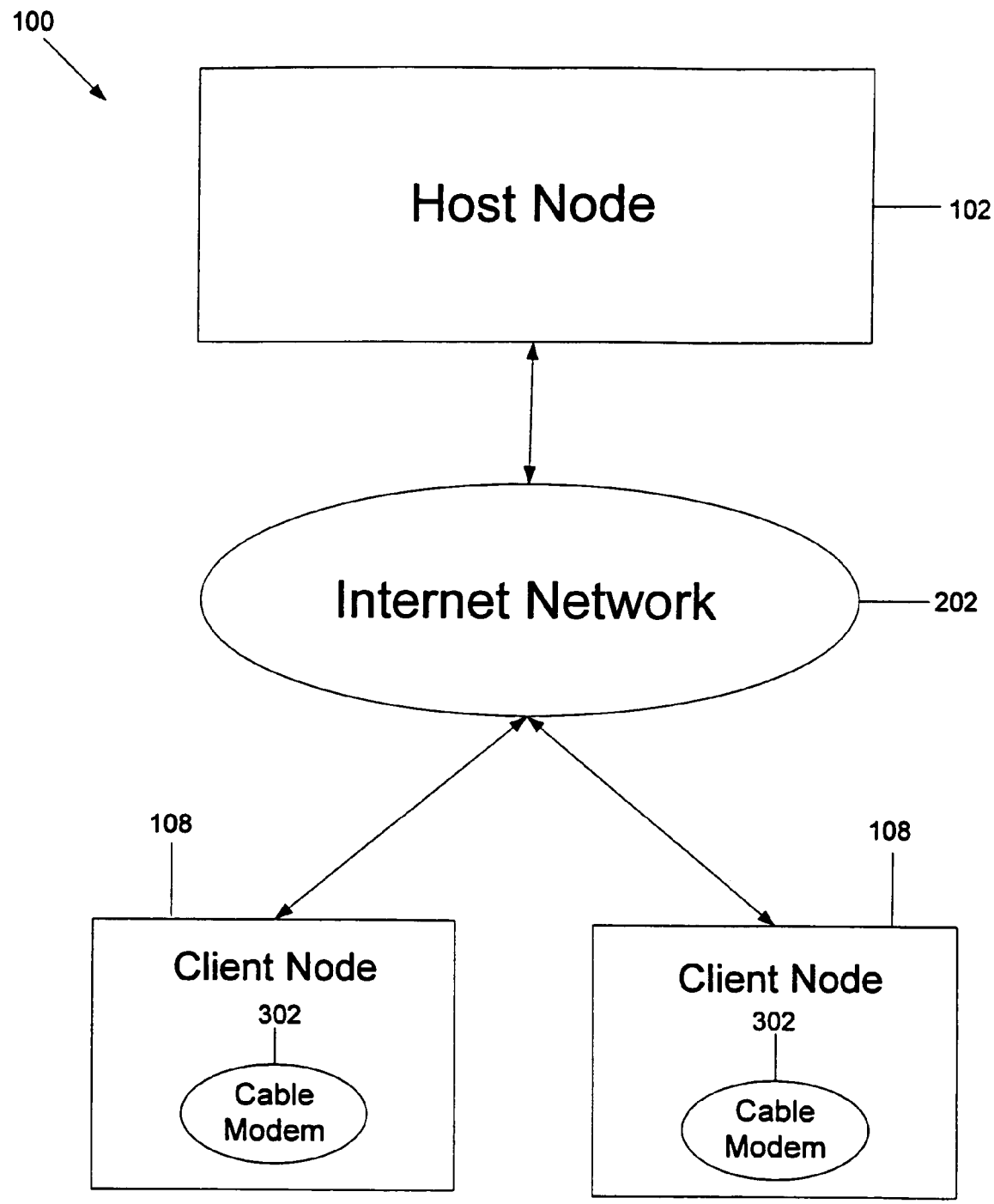
Figure 3B:
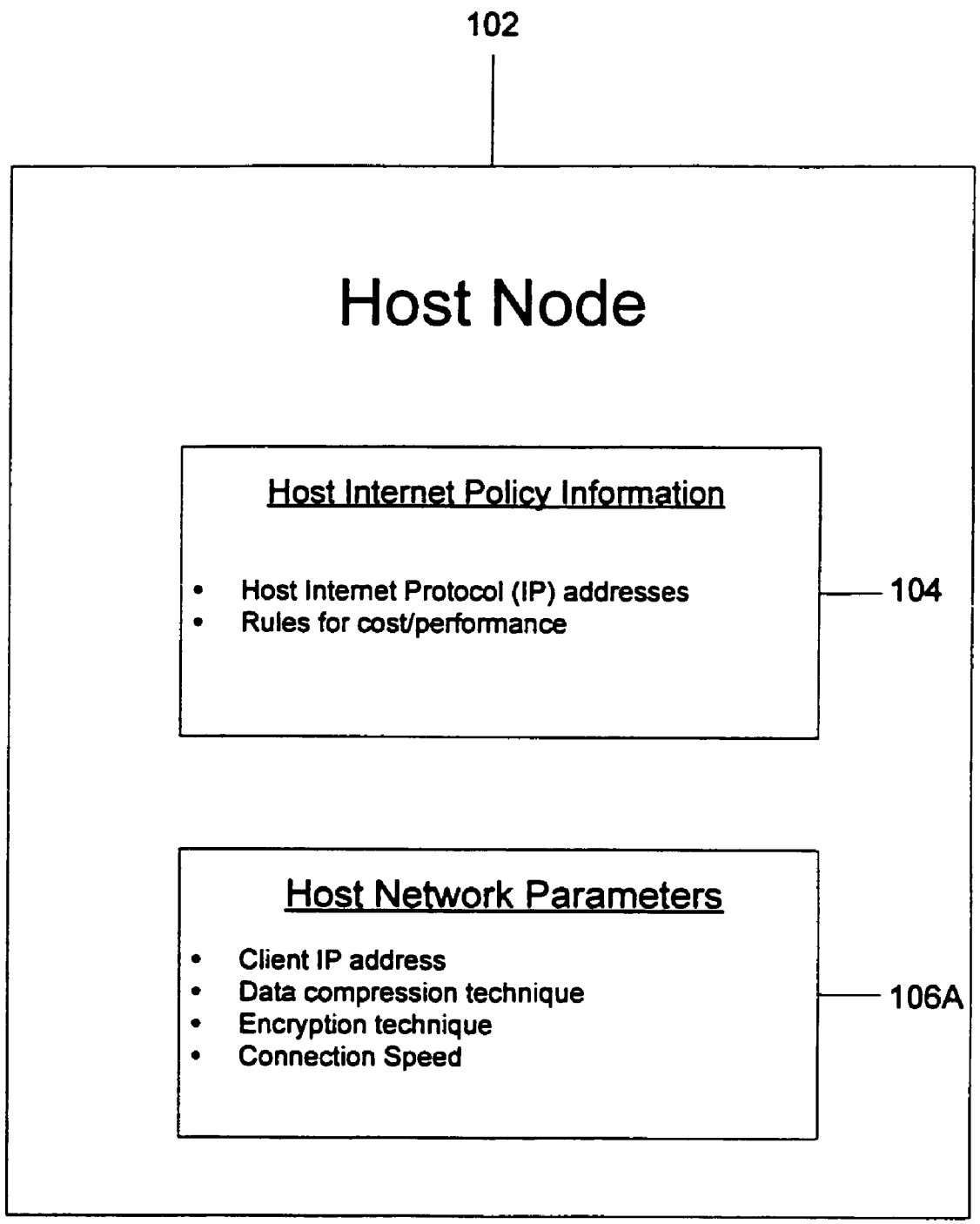
FIG. 3B is a block diagram of the host node in the system of FIG. 3A.
Figure 3C:
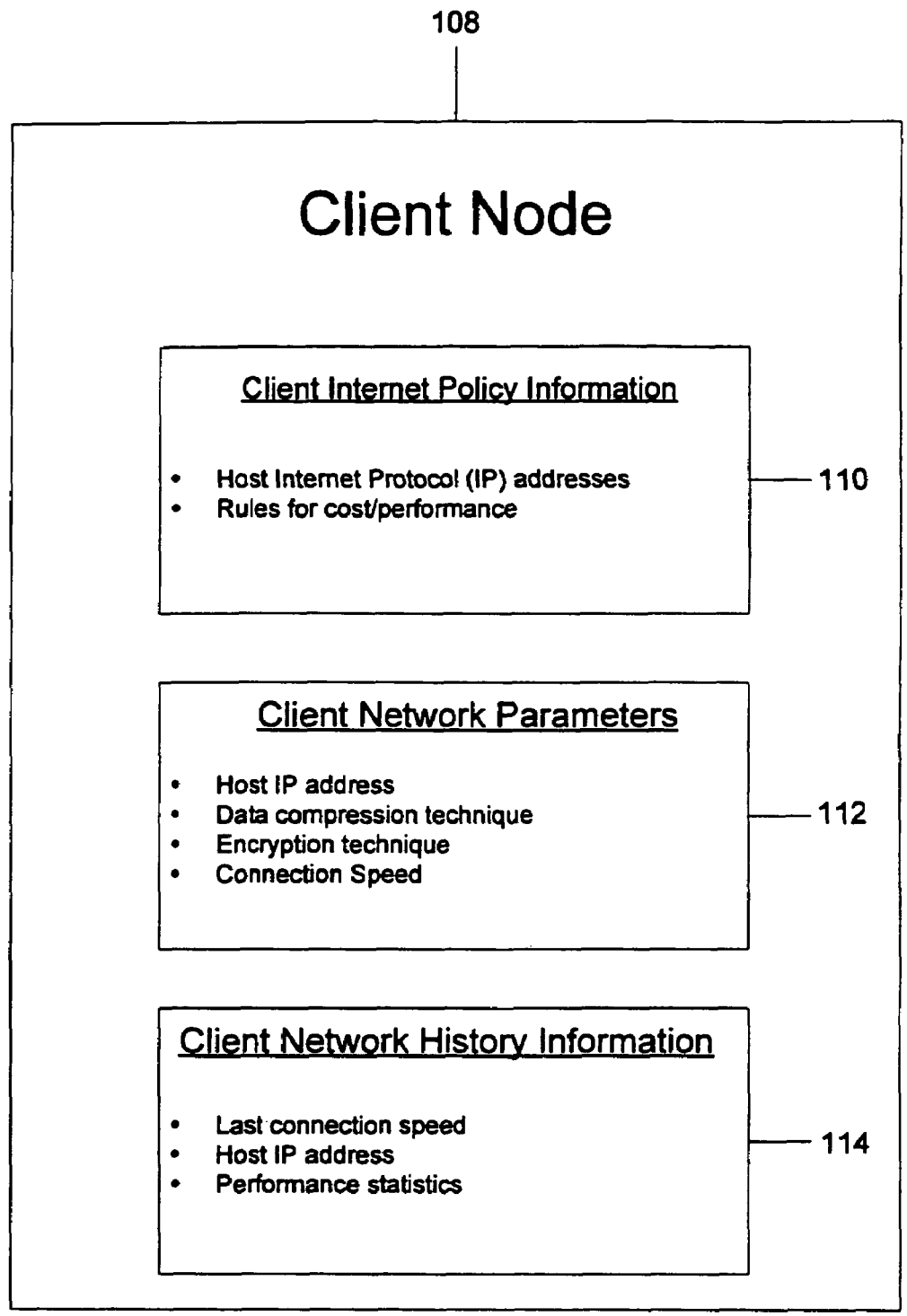
FIG. 3C is a block diagram of the client node in the system of FIG. 3A.

FIG. 3A is a block diagram of another implementation of the system 100 shown in FIG. 1. In this implementation, each client node 108 connects to the host node 102 using the Internet network 202. For example, the host node 102 and each client node 108 may be directly accessible to each other through the Internet network 202 using broadband connections.

Each client node 108 includes a cable modem 302 to communicate with the host node 102. During operation, each client node 108 uses its cable modem 302 to initiate a high-speed connection to the host node using the Internet network 202. The cable modem 302 of each client node 108 uses the network configuration parameters 112 when connecting to the host node 102. Once these connections are established, each client node 108 is able to communicate with the host node 102.

FIG. 3B is a block diagram of the host node in the system of FIG. 3A. In this implementation, the host node 102 maintains both its Internet policy information 104 and its network parameters 106A in a database. The network parameters 106A are part of the full set of network configuration parameters 106 maintained by the host node 102, and are associated with a connection to a given client node 108. In one implementation, the host node 102 provides the Internet policy information 104 to each client node 108. The host node 102 also configures its network interface to the Internet network 202 using the network parameters 106A.

As shown in the example in FIG. 3B, the Internet policy information 104 may include, for example, Internet Protocol (IP) addresses and rules for specifying cost or performance criteria. The IP addresses include the various IP addresses that may be used by each client 108 to access the host node 102. The rules in the Internet policy information 104 are used to specify various cost or performance criteria that are to be implemented by the host node 102. In one implementation, the host node 102 provides these rules to each client node 108. The rules may specify that cost considerations are to be strongly weighted, that performance considerations are to be strongly weighted, or that cost and performance considerations are to be more evenly weighted. In one implementation, the various cost or performance criteria are based upon analysis of performance statistics gathered on the host node 102 from each client node 108. These rules will be used to determine the configuration of modem parameters, such as parameters 106 on the host node 102 or the parameters 112 on each client node 108.

As also shown in FIG. 3B, the network parameters 106A may include, for example, a client IP address, a data compression technique, an encryption technique, and a connection speed. The client IP address corresponds to the IP address of the client node 108 that is connected to the host node 102. The data compression technique and the encryption technique specify the type of data compression and encryption that are to be used during network communication. The data compression technique could be any standard or recognized form of data compression. Similarly, the encryption technique could be asymmetric, symmetric, or any other standard or recognized form of encryption. The connection speed specifies the speed of data transmission used to communicate with the host node 102. The network parameters 106A may include any number of other standard parameters that may be used to set and configure the network interface to the host node 102.

FIG. 3C is a block diagram of the client node in the system of FIG. 3A. In this implementation, the client node 108 maintains its Internet policy information 110, its network parameters 112, and its network history information 114 in a database. The client node 108 is able to use the Internet policy information 110 along with the network history information 114 to modify its network parameters 112 when appropriate. The network parameters 112 affect the interface settings used by the client node 108 when communicating with the host node 102.

The network policy information 110 includes host IP addresses and rules for specifying cost or performance criteria. The host IP addresses are associated with the host node 102. The rules in the Internet policy information 110 are used to specify various cost or performance criteria that are to be implemented by the client node 108. In one implementation, the client node 108 receives these from the host node 102.

As also shown in FIG. 3C, the network parameters 112 may include, for example, a host IP address, a data compression technique, an encryption technique, and a connection speed. The host IP address is associated with the host node 102. The data compression technique could be any standard or recognized form of data compression. Similarly, the encryption technique could be any standard or recognized form of encryption. The connection speed specifies the speed of data transmission between the client node 108 and the host node 102 using the Internet network 202.

The network history information 114 includes various history, performance, statistical, or other forms of information relating to the use of the network parameters 112 for connections made between the client node 108 and the host node 102. As shown in FIG. 3C, the network history information 114 may include, for example, the last connection speed, the host IP address, and performance statistics. The last connection speed specifies the speed of the previous connection between the client node 108 and the host node 102. The host IP address is associated with the previous address used by the client node 108 to connect to the host node 102. The performance statistics may include various forms of statistical information relating to the performance of connections between the client node 108 and the host node 102. The performance statistics may also include failure rate information relating to these connections, such as disconnect rates and connect failure rates. The network history information 114 may include many other forms of information in addition to the information listed in FIG. 3C, such as the total number of connections attempted and/or established with the host node 102, and individual or average session lengths with the host node 102.

During operation, the client node 108 may use its Internet policy information 110, along with its network history information 114, to determine whether it will modify its network parameters 112. In doing so, the client node 108 uses the rules contained within the Internet policy information 110 that specify the cost and performance criteria. If these rules specify that performance considerations are to be strongly weighted, then the client node 108 may consider making modifications to its parameters 112 to improve performance. For example, the client node 108 may try increasing the connection speed in the network parameters 112 to achieve higher performance. Alternatively, the client node 108 may select a different host IP address in the network parameters 112 if connections made using the current host IP address are not yielding high enough performance, as evidenced by the statistics maintained in the network history information 114. If the rules, however, specify that cost considerations are to be more strongly weighted, then the client node 108 may decide to modify its network parameters 112 to use a slower speed, or a more cost-efficient, connection to the host node 102. In this fashion, the client node 108 is capable of dynamically modifying its network parameters 112 based on the rules contained in the Internet policy information 110 and on its collected network history information 114.

Figure 4:
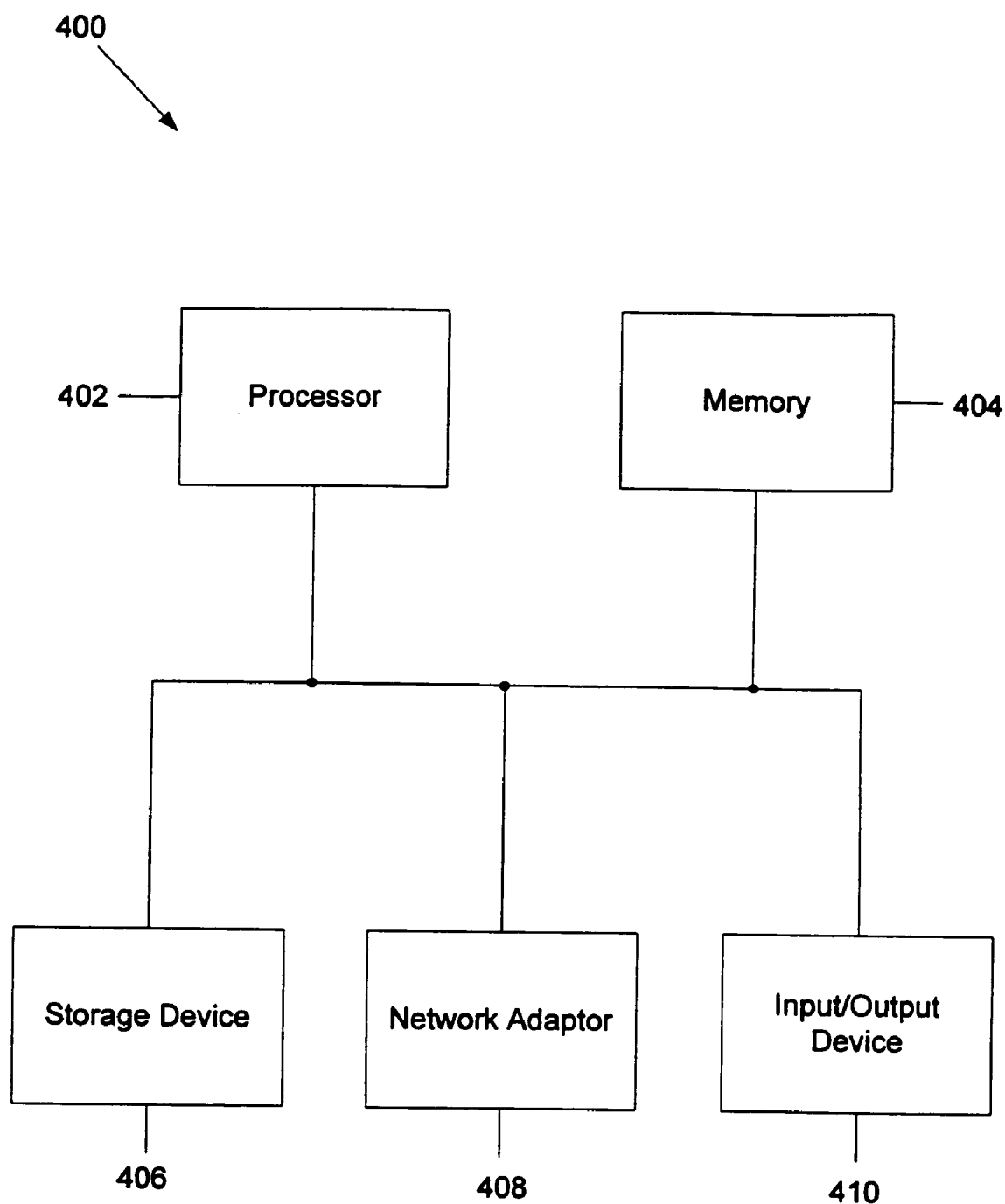
FIG. 4 is a block diagram of a computing system.

FIG. 4 is a block diagram of a computing system 400 that may be part of the client node 108. The computing system 400 includes a processor 402, a memory 404, a storage device 406, a network adaptor 408, and an input/output device 410. The components 402, 404, 406, 408, and 410 are interconnected using a system bus. The processor 402 is capable of processing instructions for execution within the computing system 400. In one implementation, the processor 402 is a single-threaded processor. In another implementation, the processor 402 is a multi-threaded processor. The processor 402 is capable of processing instructions stored in the memory 404.

The memory 404 stores information within the computing system 400. In one implementation, the memory 404 is a computer-readable medium. In certain implementations, the memory 404 is either a volatile or a non-volatile memory unit.

The storage device 406 is capable of providing mass storage for the computing system 400. For example, the storage device 406 may provide database storage for the computing system 400. In one implementation, the storage device 406 is a computer-readable medium. In various different implementations, the storage device 406 may be a floppy disk device, a hard disk device, an optical disk device, or a tape device.

The network adaptor 408 provides an interface to external network devices. For example, when included within the client node 108 shown in FIG. 2A, the network adaptor 408 is a modem adaptor to interface with the modem 206. When included within the client node 108 shown in FIG. 3A, the network adaptor 408 includes a cable-modem adaptor to interface with the cable modem 302.

The input/output device 410 provides input/output operations for the computing system 400. The input/output device 410 may include, for example, a keyboard, a pointing device, and/or a display device.

A number of implementations have been described. Nevertheless, it will be understood that various modifications may be made. Accordingly, other implementations are within the scope of the following claims.

What is claimed is:

1. A computer-implemented method for modifying network configuration information, the method comprising:

establishing, at a host node, network connections with multiple client nodes using at least one host network configuration parameter associated with the host node, the multiple client nodes including a first client node configured to establish network connections with the host node using at least one client network configuration parameter associated with the first client node and a second client node configured to establish network connections with the host node using at least one client network configuration parameter associated with the second client node;

accessing, at the host node, first configuration history information describing first performance statistics of at least one previous and no longer active network connection between the host node and the first client node;

accessing, at the host node, second configuration history information describing second performance statistics of at least one previous and no longer active network connection between the host node and the second client node;

accessing, at the host node, host policy information including at least one host network connection performance rule;

using the first configuration history information, the second configuration history information, and the host policy information to determine whether performance statistics including the first and second performance statistics associated with the network connections between the host node and the first and second client nodes satisfy the at least one host network connection performance rule;

if it is determined that the performance statistics associated with the network connections between the host node and the multiple client nodes fail to satisfy the at least one host network connection performance rule, modifying the at least one host network configuration parameter used to establish the network connections between the host node and the first and second client nodes;

accessing client policy information associated with the first client node including at least one client network connection performance rule associated with the first client node;

using the first configuration history information and the client policy information associated with the first client node to determine whether the first performance statistics satisfy the client network connection performance rule associated with the first client node; and if it is determined that the first performance statistics fail to satisfy the client network connection performance rule associated with the first client node, modifying the client network configuration parameter associated with the first client node used to establish the network connections between the host node and the first client node based on the first configuration history information and the second configuration history information.

2. The computer-implemented method of claim 1 further comprising:

accessing client policy information associated with the second client node including at least one client network connection performance rule associated with the second client node;

using the second configuration history information and the client policy information associated with the second client node to determine whether the second performance statistics satisfy the client network connection performance rule associated with the second client node; and if it is determined that the second performance statistics fail to satisfy the client network connection performance rule associated with the second client node, modifying the client network configuration parameter associated with the second client node used to establish the network connections between the host node and the second client node.

3. The computer-implemented method of claim 2 wherein modifying the client network configuration parameter associated with the second client node used to establish the network connections between the host node and the second client node comprises modifying the client network configuration parameter associated with the second client node used to establish the network connections between the host node and the second client node based on the first configuration history information and the second configuration history information.

4. The computer-implemented method of claim 1 wherein:

accessing, at the host node, first configuration history information describing first performance statistics of at least one previous and no longer active network connection between the host node and the first client node includes accessing performance statistics including a total number of connections the first client node has attempted with the host node; and accessing, at the host node, second configuration history information describing second performance statistics of at least one previous and no longer active network connection between the host node and the second client node includes accessing performance statistics including a total number of connections the second client node has attempted with the host node.

5. The computer-implemented method of claim 1 wherein:

accessing, at the host node, first configuration history information describing first performance statistics of at least one previous and no longer active network connection between the host node and the first client node includes accessing performance statistics including a total number of connections the first client node has established with the host node; and accessing, at the host node, second configuration history information describing second performance statistics of at least one previous and no longer active network connection between the host node and the second client node includes accessing performance statistics including a total number of connections the second client node has established with the host node.

6. The computer-implemented method of claim 1 wherein:

accessing, at the host node, first configuration history information describing first performance statistics of at least one previous and no longer active network connection between the host node and the first client node includes accessing performance statistics including an individual session length of a connection between the first client node and the host node; and accessing, at the host node, second configuration history information describing second performance statistics of at least one previous and no longer active network connection between the host node and the second client node includes accessing performance statistics including an individual session length of a connection between the second client node and the host node.

7. The computer-implemented method of claim 1 wherein:

accessing, at the host node, first configuration history information describing first performance statistics of at least one previous and no longer active network connection between the host node and the first client node includes accessing performance statistics including an average session length of connections between the first client node and the host node; and accessing, at the host node, second configuration history information describing second performance statistics of at least one previous and no longer active network connection between the host node and the second client node includes accessing performance statistics including an average session length of connections between the second client node and the host node.

8. The computer-implemented method of claim 1 wherein:

accessing, at the host node, first configuration history information describing first performance statistics of at least one previous and no longer active network connection between the host node and the first client node includes accessing performance statistics including a total number of connections the first client node has attempted with the host node, a total number of connections the first client node has established with the host node, an individual session length of a connection between the first client node and the host node, and an average session length of connections between the first client node and the host node; and accessing, at the host node, second configuration history information describing second performance statistics of at least one previous and no longer active network connection between the host node and the second client node includes accessing performance statistics including a total number of connections the second client node has attempted with the host node, a total number of connections the second client node has established with the host node, an individual session length of a connection between the second client node and the host node, and an average session length of connections between the second client node and the host node.

9. The computer-implemented method of claim 1 wherein:

accessing, at the host node, first configuration history information describing first performance statistics of at least one previous and no longer active network connection between the host node and the first client node includes accessing performance statistics including, for connections established between the first client node and the host node, abnormal disconnect rate, retain rate, busy rate, and signal-to-noise rate; and accessing, at the host node, second configuration history information describing second performance statistics of at least one previous and no longer active network connection between the host node and the second client node includes accessing performance statistics including, for connections established between the second client node and the host node, abnormal disconnect rate, retain rate, busy rate, and signal-to-noise rate.

10. At least one computer-readable storage medium having computer-executable instructions stored therein that, when executed, perform operations comprising:

establishing, at a host node, network connections with multiple client nodes using at least one host network configuration parameter associated with the host node, the multiple client nodes including a first client node configured to establish network connections with the host node using at least one client network configuration parameter associated with the first client node and a second client node configured to establish network connections with the host node using at least one client network configuration parameter associated with the second client node;

accessing, at the host node, first configuration history information describing first performance statistics of at least one previous and no longer active network connection between the host node and the first client node;

accessing, at the host node, second configuration history information describing second performance statistics of at least one previous and no longer active network connection between the host node and the second client node;

accessing, at the host node, host policy information including at least one host network connection performance rule;

using the first configuration history information, the second configuration history information, and the host policy information to determine whether performance statistics including the first and second performance statistics associated with the network connections between the host node and the first and second client nodes satisfy the at least one host network connection performance rule;

if it is determined that the performance statistics associated with the network connections between the host node and the multiple client nodes fail to satisfy the at least one host network connection performance rule, modifying the at least one host network configuration parameter used to establish the network connections between the host node and the first and second client nodes;

accessing client policy information associated with the first client node including at least one client network connection performance rule associated with the first client node;

using the first configuration history information and the client policy information associated with the first client node to determine whether the first performance statistics satisfy the client network connection performance rule associated with the first client node; and if it is determined that the first performance statistics fail to satisfy the client network connection performance rule associated with the first client node, modifying the client network configuration parameter associated with the first client node used to establish the network connections between the host node and the first client node based on the first configuration history information and the second configuration history information.

11. The at least one computer-readable storage medium of claim 10 further comprising:

accessing client policy information associated with the second client node including at least one client network connection performance rule associated with the second client node;

using the second configuration history information and the client policy information associated with the second client node to determine whether the second performance statistics satisfy the client network connection performance rule associated with the second client node; and it is determined that the second performance statistics fail to satisfy the client network connection performance rule associated with the second client node, modifying the client network configuration parameter associated with the second client node used to establish the network connections between the host node and the second client node.

12. The at least one computer-readable storage medium of claim 11 wherein modifying the client network configuration parameter associated with the second client node used to establish the network connections between the host node and the second client node comprises modifying the client network configuration parameter associated with the second client node used to establish the network connections between the host node and the second client node based on the first configuration history information and the second configuration history information.

13. The at least one computer-readable storage medium of claim 10 wherein:

accessing, at the host node, first configuration history information describing first performance statistics of at least one previous and no longer active network connection between the host node and the first client node includes accessing performance statistics including a total number of connections the first client node has attempted with the host node; and accessing, at the host node, second configuration history information describing second performance statistics of at least one previous and no longer active network connection between the host node and the second client node includes accessing performance statistics including a total number of connections the second client node has attempted with the host node.

14. The at least one computer-readable storage medium of claim 10 wherein:

accessing, at the host node, first configuration history information describing first performance statistics of at least one previous and no longer active network connection between the host node and the first client node includes accessing performance statistics including a total number of connections the first client node has established with the host node; and accessing, at the host node, second configuration history information describing second performance statistics of at least one previous and no longer active network connection between the host node and the second client node includes accessing performance statistics including a total number of connections the second client node has established with the host node.

15. The at least one computer-readable storage medium of claim 10 wherein:

accessing, at the host node, first configuration history information describing first performance statistics of at least one previous and no longer active network connection between the host node and the first client node includes accessing performance statistics including an individual session length of a connection between the first client node and the host node; and accessing, at the host node, second configuration history information describing second performance statistics of at least one previous and no longer active network connection between the host node and the second client node includes accessing performance statistics including an individual session length of a connection between the second client node and the host node.

16. The at least one computer-readable storage medium of claim 10 wherein:

accessing, at the host node, first configuration history information describing first performance statistics of at least one previous and no longer active network connection between the host node and the first client node includes accessing performance statistics including an average session length of connections between the first client node and the host node; and accessing, at the host node, second configuration history information describing second performance statistics of at least one previous and no longer active network connection between the host node and the second client node includes accessing performance statistics including an average session length of connections between the second client node and the host node.

17. The at least one computer-readable storage medium of claim 10 wherein:

accessing, at the host node, first configuration history information describing first performance statistics of at least one previous and no longer active network connection between the host node and the first client node includes accessing performance statistics including a total number of connections the first client node has attempted with the host node, a total number of connections the first client node has established with the host node, an individual session length of a connection between the first client node and the host node, and an average session length of connections between the first client node and the host node; and accessing, at the host node, second configuration history information describing second performance statistics of at least one previous and no longer active network connection between the host node and the second client node includes accessing performance statistics including a total number of connections the second client node has attempted with the host node, a total number of connections the second client node has established with the host node, an individual session length of a connection between the second client node and the host node, and an average session length of connections between the second client node and the host node.

18. The at least one computer-readable storage medium of claim 10 wherein:

accessing, at the host node, first configuration history information describing first performance statistics of at least one previous and no longer active network connection between the host node and the first client node includes accessing performance statistics including, for connections established between the first client node and the host node, abnormal disconnect rate, retain rate, busy rate, and signal-to-noise rate; and accessing, at the host node, second configuration history information describing second performance statistics of at least one previous and no longer active network connection between the host node and the second client node includes accessing performance statistics including, for connections established between the second client node and the host node, abnormal disconnect rate, retain rate, busy rate, and signal-to-noise rate.

* * * * *